US012631034B2

(12) United States Patent
Browne

(10) Patent No.: US 12,631,034 B2
(45) Date of Patent: May 19, 2026

(54) HAMMER DRILL ATTACHMENT

(71) Applicant: Ryan William Browne, Alexandra Headland (AU)

(72) Inventor: Ryan William Browne, Alexandra Headland (AU)

( * ) Notice: Subject to any disclaimer, the term of this patent is extended or adjusted under 35 U.S.C. 154(b) by 109 days.

(21) Appl. No.: 18/412,759

(22) Filed: Jan. 15, 2024

(65) Prior Publication Data

US 2025/0188756 A1 Jun. 12, 2025

(30) Foreign Application Priority Data

Dec. 12, 2023 (AU) ................................ 2023282194

(51) Int. Cl.
*E04G 21/06* (2006.01)
*B25D 17/00* (2006.01)

(52) U.S. Cl.
CPC ........... *E04G 21/065* (2013.01); *B25D 17/00* (2013.01); *B25D 2250/105* (2013.01)

(58) Field of Classification Search
None
See application file for complete search history.

(56) References Cited

U.S. PATENT DOCUMENTS

2008/0253221 A1* 10/2008 Linley ................... E04G 21/066
366/128
2017/0218576 A1* 8/2017 Lindley ................. E01C 19/402

FOREIGN PATENT DOCUMENTS

CN 110259136 A * 9/2019
DE 102008032483 B3 * 11/2009 ........... E04G 21/063
KR 2023160447 A * 11/2023 ......... C04B 22/0006

OTHER PUBLICATIONS

Decker 102008032483B3 English Translation 2009 (Year: 2009).*
Huang CN110259136A English Translation 2019 (Year: 2019).*
Juhyuk 2023160447A English Translation 2023 (Year: 2023).*

* cited by examiner

*Primary Examiner* — Jacob T Minskey
*Assistant Examiner* — Adrien J Bernard
(74) *Attorney, Agent, or Firm* — Reches Patents

(57) ABSTRACT

The present invention provides a hammer drill attachment for contacting external walls of formwork for imparting external vibration to concrete poured into the formwork, the attachment comprising: an input shaft configured to receive motion from an output of a hammer drill; an output shaft configured to contact the external walls of the formwork for imparting the external vibration, the output shaft being arranged transversely relative to the input shaft to output pulsed percussions in a transverse direction relative to a longitudinal axis of the output shaft, a connecting portion for connecting the output shaft with the input shaft to transmit motion from the input shaft to the output shaft when the input shaft is receiving motion from the output of the hammer drill. In another aspect of the present invention, there is provided a method for smoothing concrete contained within external walls of formwork.

20 Claims, 7 Drawing Sheets

Side
view

Side
view

Birds eye view

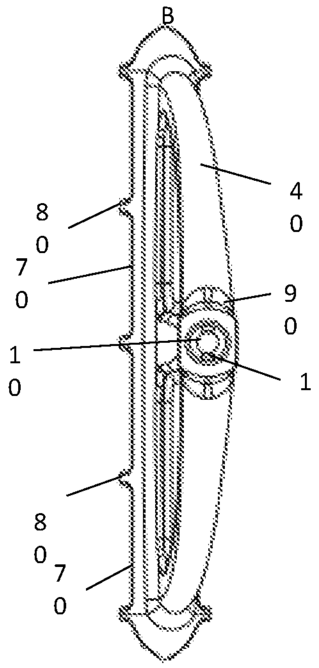
Figure 7 Bottom up view

HAMMER DRILL ATTACHMENT

TECHNICAL FIELD

The present invention relates to a hammer drill attachment for contacting external walls of formwork for imparting external vibration to concrete poured into the formwork. The present invention also relates to a method for smoothing concrete contained within formwork, using a hammer drill attachment.

BACKGROUND

High frequency electric external vibrators are used in precast yards and on construction sites to obtain high quality smooth concrete finishes without the need of traditional internal (immersion) vibration. External vibrators work on the principle of vibrating the formwork which completely removes the need of poker vibrators that need to be immersed within wet concrete.

External vibration is ideal in applications where access is difficult and reo density is high, making it difficult to use traditional immersion (poker vibe shaft) vibration.

External vibration is normally clamped to the formwork or requires the concrete mould or formwork to be mounted on a spring loaded isolation device, enabling the formwork to vibrate freely. The electric vibe motors are placed at pre-determined intervals on the formwork, depending on various factors. Such known external vibrators are generally cumbersome to mount and difficult to implement and there is at least a need to provide a more convenient way of imparting external vibration.

The present invention provides a means by which formwork may be vibrated to form a smoother surface on concrete contained within, such that upon removal of said formwork, the finish imparted on the concrete product is of a higher cosmetic standard, when compared with concrete solidified in the absence of such treatment.

SUMMARY OF INVENTION

In an aspect, the invention provides a hammer drill attachment for contacting external walls of formwork for imparting external vibration to concrete poured into the formwork, the attachment comprising: an input shaft configured to receive motion from an output of a hammer drill; an output shaft configured to contact the external walls of the formwork for imparting the external vibration, the output shaft being arranged transversely relative to the input shaft to output pulsed percussions in a transverse direction relative to a longitudinal axis of the output shaft, a connecting portion for connecting the output shaft with the input shaft to transmit motion from the input shaft to the output shaft when the input shaft is receiving motion from the output of the hammer drill.

In another aspect, the invention provides a method for smoothing concrete contained within formwork, wherein a hammer drill attachment is securely attached to a holder present on a hammer drill, and wherein the attachment comprises, an input shaft for securely attaching the hammer drill attachment to the holder of the hammer drill, and wherein the input shaft is configured to receive motion from an output of a hammer drill; an output shaft configured to contact the external walls of the formwork for imparting the external vibration, and a connecting portion for connecting the output shaft with the input shaft to transmit motion from the input shaft to the output shaft when the input shaft is receiving motion from the output of the hammer drill, and wherein the method for smoothing concrete comprises positioning the output shaft of the hammer drill attachment to be in direct contact with the external walls of the formwork, such that external vibrations are imparted onto concrete contained within said formwork, when the hammer drill is in operation.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 7 is a bottom-up view of an embodiment of the present invention, looking up from the input shaft region.

DETAILED DESCRIPTION OF PREFERRED EMBODIMENTS

Figure 1:
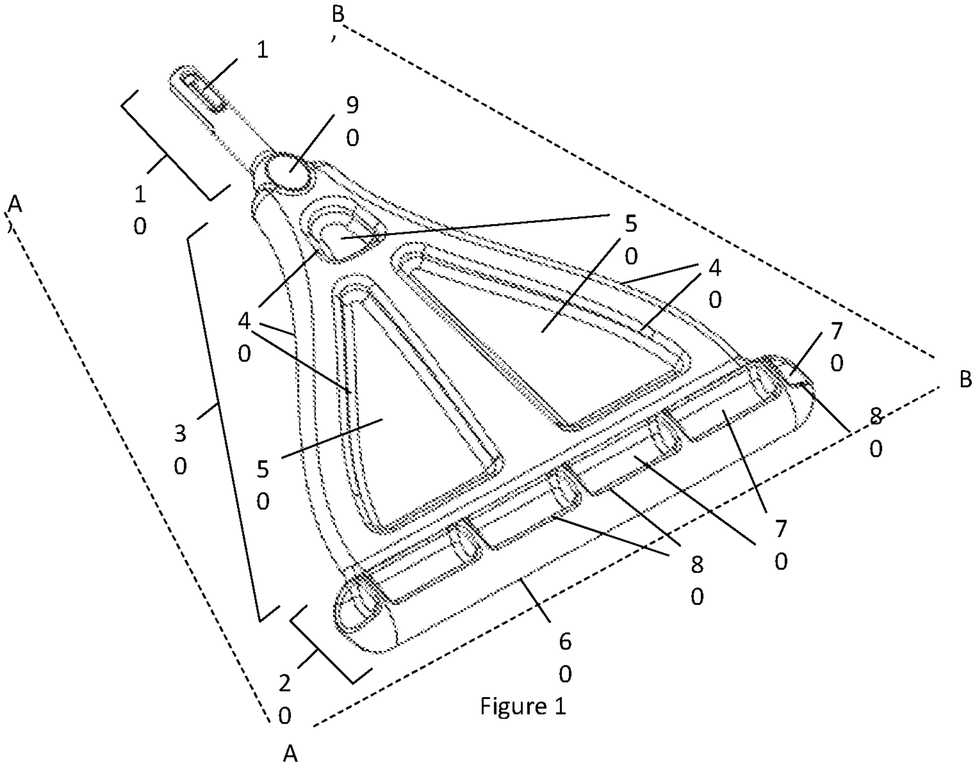
FIG. 1 is a perspective view of the upper side of a percussive drill attachment in accordance with an embodiment of the present invention.
Figure 2:
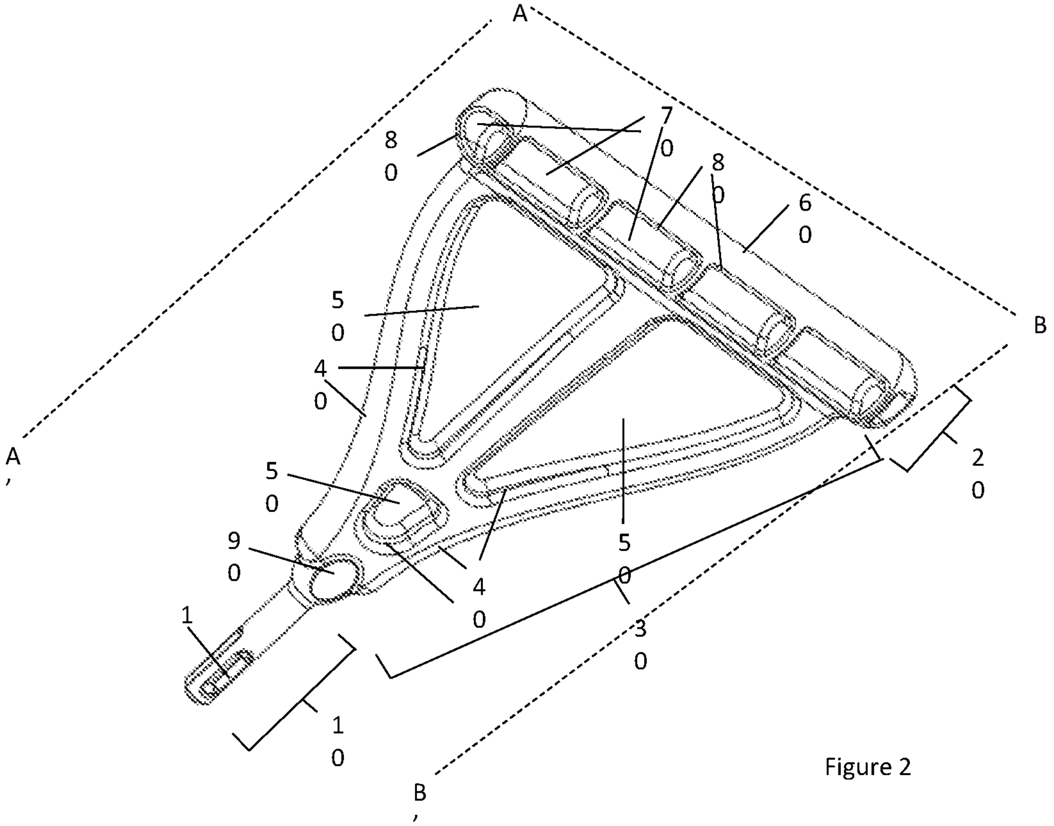
FIG. 2 is a perspective view of the lower side of a percussive drill attachment in accordance with an embodiment of the present invention.
Figure 3:
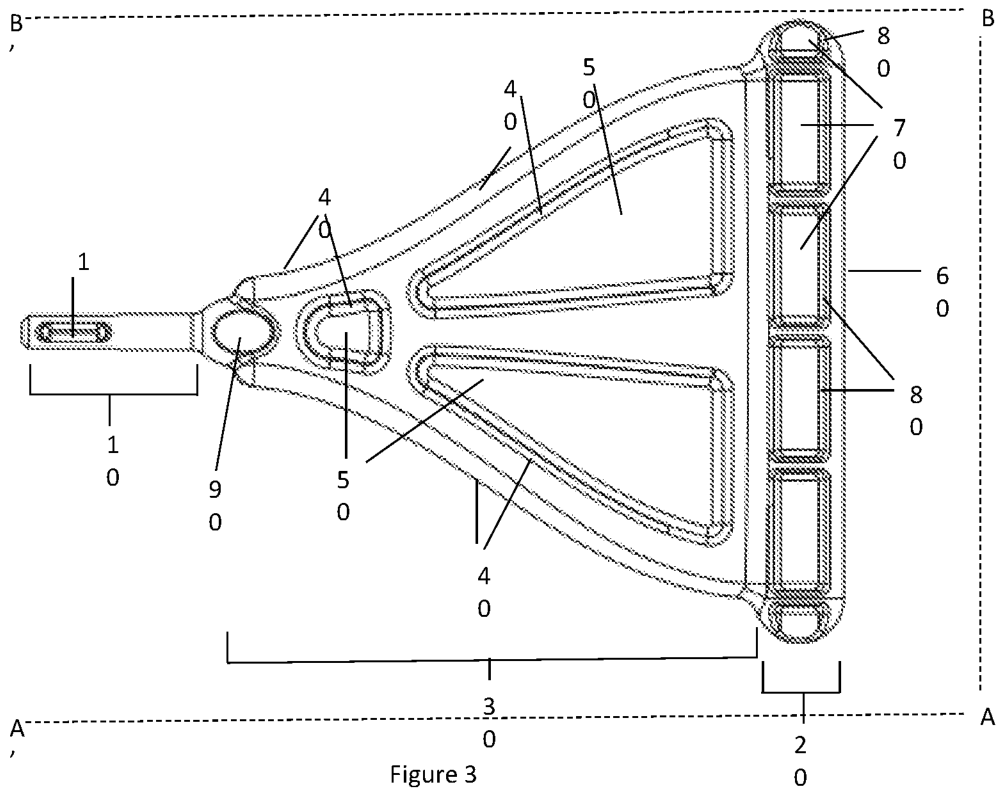
FIG. 3 is a schematic diagram of a percussive drill attachment in accordance with an embodiment of the present invention.
Figure 4:
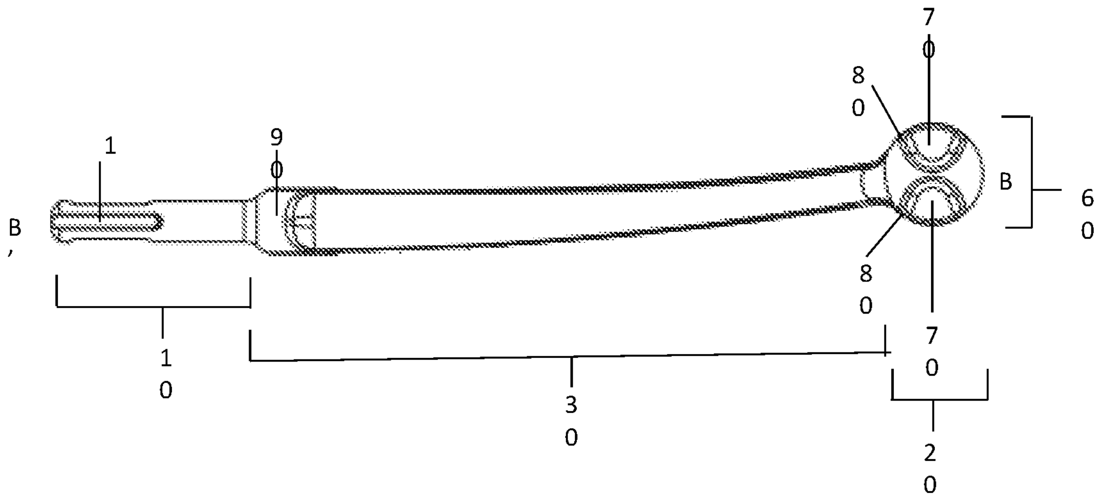
FIG. 4 is a side view of a percussive drill attachment from side B to B', in accordance with an embodiment of the present invention.
Figure 5:
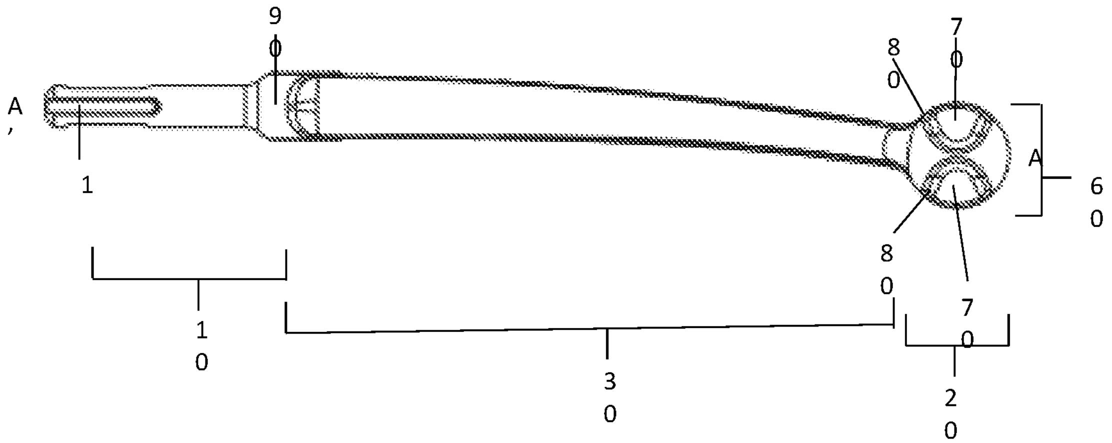
FIG. 5 is a side view of a percussive drill attachment from side A to A', in accordance with an embodiment of the present invention.
Figure 6:
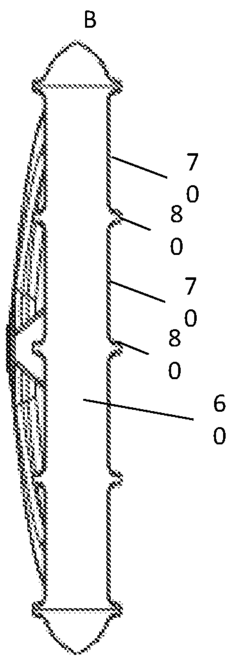
FIG. 6 is a bird's eye view of an embodiment of the present invention, looking down from the output shaft region.

With reference to FIGS. 1, 2 and 3, the attachment is inserted via its input shaft (10) into an aperture, most commonly known as a tool holder, of a compatible hammer drill, also known as a percussive drill. The input shaft comprises grooves (1) along at least part of its length, such that the attachment can be held securely in place by protruding members or flanges present within the aperture of the tool holder.

Once the attachment is securely attached, the user will be able to apply a vibrational force to the output shaft (20), by the normal operations of a percussive drill. Briefly, the actions encompassed by the normal operations of a percussive drill entails depression of a trigger mounted on the body of the percussive drill, typically on the handle of the drill, which initiates a motorized hammering mechanism, in which a series of rapid, short thrusting motions occur within the piston, contained in the body of the percussive drill, which itself is typically positioned in the proximity of the tool holder slot. The hammering motions from within the body of the percussive drill are transferred to the attachment head, as the vibrational energy is transferred from one end of the attachment head, at the input shaft (10), to the other, at the output shaft (20). This motion is made possible as the grooves (1) along part of the length of the input shaft permit sliding of the attachment head to reciprocate the hammering motion generated from within the body of the percussive drill.

The duration and the intensity of the hammering motion may be controlled by the user, in accordance with the duration by which pressure is applied to the trigger of the percussive drill.

In one embodiment of the present invention, the output shaft (20) is preferably arranged traversely relative to the input shaft (10), to output pulsed percussions in a transverse direction relative to a longitudinal axis of the output shaft (20). This arrangement ensures the output shaft (20) has a greater surface area of contact. The output shaft (20) generally features a cylindrical head, having a curved contact surface (60) to allow the user to apply a vibrational force at any angle that may be convenient at the time of use. This in turn offers ease of use to the user in terms of allowing the percussive drill with attachment to be held and operated in any orientation that is comfortable during use. In a preferred embodiment, the curved contact surface may subtend an angle of 270 degrees and more preferably, less than 180 degrees.

In another embodiment, the output shaft (20) preferably comprises of a diameter that is greater than or at least equal to the connecting portion (30).

To use the percussive drill attachment, the output shaft of the attachment is positioned such that the curved contact surface (60) of the output shaft (20) is in direct contact with the material in need of external vibration, which may include the external walls of formwork. The formwork may contain concrete or other similar materials.

In some embodiments, given that the output shaft (20) is used for vibrating hard surfaces, thus is frequently in direct contact with said surfaces, various features may be present on the output shaft itself, to assist with imparting qualities of strength and durability. These qualities may be particularly desirable, especially if the attachment is to be used routinely on construction sites or similar, for heavy-duty use.

An example of such strengthening features may be seen on FIGS. 1, 2 and 3 wherein strengthening members (80) are placed around the periphery of hollow sections (70) of the output shaft (20). The hollow sections (70) impart qualities of resilience, offering some flexibility in the output shaft (20), as it carries out its function of hammering against a contact surface, using rapid vibrational energy. The strengthening members (80) reinforce the hollow sections (70) by providing additional strength to the output shaft (20) as the user operates the percussive drill with attachment.

In some embodiments of the present invention, the ends of the output shaft (20) are rounded and may further feature additional hollow sections (70), lined with strengthening members (80). The benefit of having such ends on the output shaft (20), is to further facilitate ease of use and to ensure that the percussive drill attachment may be used for a diversity of applications. For example, if there is a need for finer control of vibrational energy, applied over a smaller surface area, the user may angle the percussive drill with attachment to be perpendicular to the contact surface in need of vibrations. By having the flexibility to change the orientation of the attachment, it offers the user more options during use, should there not be a need to use the much larger surface area that extends across from A to B of the output shaft (20) on FIGS. 1, 2 and 3.

Another reason why rounded ends of the output shaft (20) may be beneficial, include the ability to reduce damage to for example, timber formwork, that might be re-used in the future for other applications or projects.

A further benefit of having hollow areas (70) present within the attachment, reinforced around its peripheries by strengthening members (80), is in reducing the overall weight of the attachment without affecting its functionality, strength and durability.

With reference to FIGS. 4, 5, 6 and 7, in a preferred embodiment, the connecting portion (30) between the input shaft (10) and the output shaft (20) may be designed to have curvature, such that the connecting portion bends away from a longitudinal axis of the input shaft (10), in a way that does not intersect with the longitudinal axis of the output shaft (20). One of the benefits of this feature may include being able to centralize the output shaft (20) on the surface to be vibrated, whilst the user applies pressure on it. In other words, the attachment may be better stabilized and more easily held in a fixed position, during its operation, if curvature is applied to its design.

In a preferred embodiment of the present invention, the connecting portion (30) comprises a generally divergent configuration that allows vibrational energy to diverge from the vibrational source of energy at the input shaft (10) to the head of the output shaft (20). This configuration allows the vibrational energy to spread outwardly, such that vibrations can be applied across a greater surface area, at the output shaft (20) end.

The length of the connecting portion may vary. However, in preferred embodiments, the distance between the input shaft (10) and the output shaft (20) is such that vibrational energy can be efficiently transferred across the attachment, preferably minimising any loss in energy transfer as vibrational energy disperses from its source of origin at the input shaft (10), to the output shaft (20). Other considerations in relation to the length of the connecting portion, may include ergonomic considerations, in that it may be designed in such a way as to offer enough distance to allow the attachment to be used comfortably during operation.

In another embodiment of the present invention, the connecting portion (30) preferably houses resilient regions (50), which are similar to the hollow regions on the head of the output shaft (70), in that they are regions of lesser thickness that provide resilience and some flexibility to the attachment as it carries out a series of rapid hammering motions. These resilient regions (50) are preferably reinforced along their peripheries by the presence of strengthening ribs (40), which function in a similar manner to the strengthening members (80) on the output shaft (70). As discussed above, the resilient regions (50) being similar to the hollow regions (70), also contribute towards reducing the overall weight of the attachment, whilst maintaining strength and durability, qualities that are imparted by the strengthening ribs (40).

In a preferred embodiment of the present invention, strengthening ribs (40) may also be present along at least a length, more preferably along the entire length, of the periphery of the connecting portion (30). This further improves strength and durability when the attachment is in use.

In another embodiment of the present invention, the connecting portion (30) may have a proximal joining section (90) that forms a point of connection between the connecting portion (30) and the input shaft (20). The proximal joining section preferably houses further reinforcements, similar to those of the strengthening ribs (40) and strengthening members (80), to improve durability of the attachment when in use.

In another preferred embodiment, the present invention is preferably constructed using high carbon steel.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

It is to be further understood that the invention may be used for applications other than those described herein. For example, the attachment may be useful for clearing channels or piping on concrete pumps, which clog easily, especially at the joints. By applying vibrational energy at these joint regions, slurry may be loosened for free flow through said channels or piping. As such, the invention may be used for any suitable application that requires external application of controlled vibrations.

The invention is, therefore, claimed in any of its forms or modifications within the proper scope of the appended claims appropriately interpreted by those skilled in the art.

Any references to methods, apparatus or documents of the prior art are not to be taken as constituting any evidence or admission that they formed, or form part of the common general knowledge.

What is claimed is:

1. A hammer drill attachment for contacting external walls of formwork for imparting external vibration to concrete poured into the formwork, the attachment comprising:

an input shaft configured to receive motion from an output of a hammer drill;

an output shaft configured to contact the external walls of the formwork for imparting the external vibration, the output shaft being arranged transversely relative to the input shaft to output pulsed percussions in a transverse direction relative to a longitudinal axis of the output shaft a connecting portion for connecting the output shaft with the input shaft to transmit motion from the input shaft to the output shaft when the input shaft is receiving motion from the output of the hammer drill.

2. A hammer drill attachment in accordance with claim 1 wherein the connecting portion comprises a generally divergent configuration to diverge in a direction from the input shaft towards the output shaft.

3. A hammer drill attachment in accordance with claim 1 wherein the connecting portion bends away from a longitudinal axis of the input shaft such that the longitudinal axis of the input shaft does not intersect the longitudinal axis of the output shaft.

4. A hammer drill attachment in accordance with claim 2 wherein the connecting portion comprises a plurality of profiled strengthening ribs extending between the input shaft and the output shaft.

5. A hammer drill attachment in accordance with claim 4 wherein one or more of strengthening ribs extend along a peripheral region of the connecting portion.

6. A hammer drill attachment in accordance with claim 4 wherein one or more strengthening ribs extend along a central region of the connecting portion.

7. A hammer drill attachment in accordance with claim 4 wherein the strengthening ribs are spaced apart by one or more regions of relatively lesser thickness to impart resilience to the connecting portion.

8. A hammer drill attachment in accordance with claim 1 wherein the output shaft comprises a curved contact surface extending between ends of the output shaft for contacting the external walls of the formwork.

9. A hammer drill attachment in accordance with claim 8 wherein the curved contact surface comprises one or more arcuate surfaces subtending an angle of 270 degrees and preferably less than 180 degrees.

10. A hammer drill attachment in accordance with claim 8 wherein the output shaft comprises one or more hollow sections separated by strengthening members extending between ends of the output shaft.

11. A hammer drill attachment in accordance with claim 10 wherein the hollow sections are located between the arcuate surface of the output shaft and a distal joining section of the divergent connecting portion that is joined with the output shaft.

12. A hammer drill attachment in accordance with claim 1 wherein the output shaft comprises a diameter that is greater than or at least equal to the connecting portion.

13. A hammer drill attachment in accordance with claim 1 wherein a proximal joining section of the connecting portion that connects with the input shaft is reinforced to strengthen the proximal joining section.

14. A method for smoothing concrete contained within formwork, wherein a hammer drill attachment is securely attached to a holder present on a hammer drill, and wherein the attachment comprises:

an input shaft for securely attaching the hammer drill attachment to the holder of the hammer drill, and wherein the input shaft is configured to receive motion from an output of a hammer drill;

an output shaft configured to contact the external walls of the formwork for imparting the external vibration, and a connecting portion for connecting the output shaft with the input shaft to transmit motion from the input shaft to the output shaft when the input shaft is receiving motion from the output of the hammer drill, and wherein the method for smoothing concrete comprises positioning the output shaft of the hammer drill attachment to be in direct contact with the external walls of the formwork, such that external vibrations are imparted onto concrete contained within said formwork, when the hammer drill is in operation.

15. A method for smoothing concrete according to claim 14, wherein the output shaft is arranged transversely relative to the input shaft to output pulsed percussions in a transverse direction relative to the longitudinal axis of the output shaft.

16. A method for smoothing concrete according to claim 14, wherein the connecting portion comprises a generally divergent configuration to diverge in a direction from the input shaft towards the output shaft.

17. A method for smoothing concrete according to claim 14 wherein the connecting portion bends away from a longitudinal axis of the input shaft such that the longitudinal axis of the input shaft does not intersect the longitudinal axis of the output shaft.

18. A method for smoothing concrete according to claim 14, wherein the connecting portion comprises a plurality of profiled strengthening ribs extending between the input shaft and the output shaft.

19. A method for smoothing concrete according to claim 18, wherein one or more of strengthening ribs extend along a peripheral region of the connecting portion.

20. A method for smoothing concrete according to claim 18, wherein one or more strengthening ribs extend along a central region of the connecting portion.

* * * * *